(12) United States Patent
Rotzinger et al.

(10) Patent No.: US 8,448,841 B2
(45) Date of Patent: May 28, 2013

(54) METHOD FOR MANUFACTURING A ROTOR

(75) Inventors: Ralf Rotzinger, Murg-Niederhof (DE);
Sorin Keller, Oberrohrdorf (CH); Jesus Contreras-Espada, Suhr (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 13/307,786

(22) Filed: Nov. 30, 2011

(65) Prior Publication Data
US 2012/0223126 A1   Sep. 6, 2012

(30) Foreign Application Priority Data

Dec. 3, 2010 (EP) .................................... 10193698

(51) Int. Cl.
*B23K 13/06* (2006.01)
(52) U.S. Cl.
USPC ............ 228/178; 228/102; 228/214; 228/218
(58) Field of Classification Search
USPC .................................. 228/102, 178, 214, 218
See application file for complete search history.

(56) References Cited

U.S. PATENT DOCUMENTS

| 2002/0079303 A1 | 6/2002 | Offer et al. |
| 2008/0211339 A1 | 9/2008 | Rotzinger et al. |
| 2010/0281688 A1 | 11/2010 | Keller et al. |

FOREIGN PATENT DOCUMENTS

| FR | 2148901 A5 | 3/1973 |
| WO | 2009065739 A1 | 11/2008 |

*Primary Examiner* — Erin Saad
(74) *Attorney, Agent, or Firm* — Volpe and Koenig, P.C.

(57) ABSTRACT

A method for manufacturing a rotor by welding a plurality of elements together is described. The elements have a body with cavities and surfaces to be welded to surfaces of adjacent elements. According to the method, the elements are vertically stacked one above the other to form a pile with facing surfaces to be welded together defining slots. The cavities of adjacent elements define bores that extend within the pile. Then, adjacent elements are welded together within the slots. The bore is purged with an inert gas or mixture during welding. The slots are welded at an upper part of the bore before the slots at a lower part of the bore, and a slot at the upper part of the bore is welded last.

16 Claims, 4 Drawing Sheets

METHOD FOR MANUFACTURING A ROTOR

RELATED APPLICATION

The present application hereby claims priority under 35 U.S.C. Section 119 to European Patent application number 10193698.7, filed Dec. 3, 2010, the entire contents of which are hereby incorporated by reference.

FIELD OF INVENTION

The present invention relates to the field of manufacturing rotors by welding a plurality of elements together.

The rotor can be the rotor of an electric machine such as an electric generator (turbo generator) or electric motor; alternatively also different kinds of rotors are possible and, in this respect, the rotor can be, for example, a rotor of a steam turbine or a rotor of a gas turbine.

BACKGROUND

In order to manufacture a rotor by welding a number of elements together, the elements are forged and machined first.

These elements have a cylindrical shape with inner cavities (through cavities), and are provided at the faces to be welded with collars that define between adjacent elements (when two or more elements are joined together) circumferential slots.

Then a welding is realised within the slots completely filling them in, while at the same time melting the collars and eventually also providing additional material, which is illustrated by US2008/0211339, the contents of which are incorporated by reference.

An improvement to this process includes vertically stacking all the elements to be welded one above the other to form a pile, with the collars and all the cavities connected together. Then a first welding (pre-welding) is realised within the slots (from the bottom to the top of the pile) to connect the elements together; this welding is similar to the one disclosed in US 2008/0211339, but it is such that it does not fill the whole slots in.

The pile is then tilted in the horizontal position and a final welding is realised, completely filling the slots in. Then the pile is tilted in the vertical position again and thermal treatments are carried out. Finally, the pile is tilted again in the horizontal position for a final machining, which is illustrated in WO 2009/065739, the contents of which are incorporated by reference.

In order to avoid oxidation during welding, before the welding process starts, the mutually connected cavities are purged with an inert gas or mixture of gases (such as for example a mixture of $H_2$ and Ag or $H_2$ and $N_2$).

In this respect holes are provided at the sides of the collars, to inject the purge gas or mixture (these holes are also used to monitor the welding process from the inner portion of the cavities).

Nevertheless, since the pile is vertical, and since the oxygen is heavier than the inert gas or mixture typically used, there is the risk that the welding at the lower part of the pile is realised in presence of oxygen. This must be avoided.

SUMMARY

The present disclosure is directed to a method for manufacturing a rotor by welding a plurality of elements together. At least one element has a body with at least one cavity and at least one surface to be welded to a surface of an adjacent element. The method includes stacking the elements vertically one above the other to form a pile with facing surfaces to be welded together defining slots. The cavity or cavities of adjacent elements define at least one bore that extends over at least a portion of the pile. The method also includes welding adjacent elements together within the slots, purging the bore with an inert gas or mixture during welding. The method further includes welding the slots at an upper part of the bore before the slots at a lower part of the bore and welding at least one of the slots at the upper part of the bore last.

BRIEF DESCRIPTION OF THE DRAWINGS

Further characteristics and advantages of the invention will be more apparent from the description of a preferred but non-exclusive embodiment of the method illustrated by way of non-limiting example in the accompanying drawings, in which.

DETAILED DESCRIPTION OF THE PREFERRED EMBODIMENTS

Introduction to the Embodiments

The technical aim of the present invention therefore includes providing a method addressing the aforementioned problems of the known art.

Within the scope of this technical aim, an aspect of the invention is to provide a method by which the risk of realizing a welding at the lower part of a vertical pile in presence of oxygen is greatly reduced or avoided.

The technical aim, together with these and further aspects, are attained according to the invention by providing a method in accordance with the accompanying claims.

DETAILED DESCRIPTION

In order to manufacture a rotor by welding a plurality of elements together, first the elements 1 are forged and machined.

Figure 1:
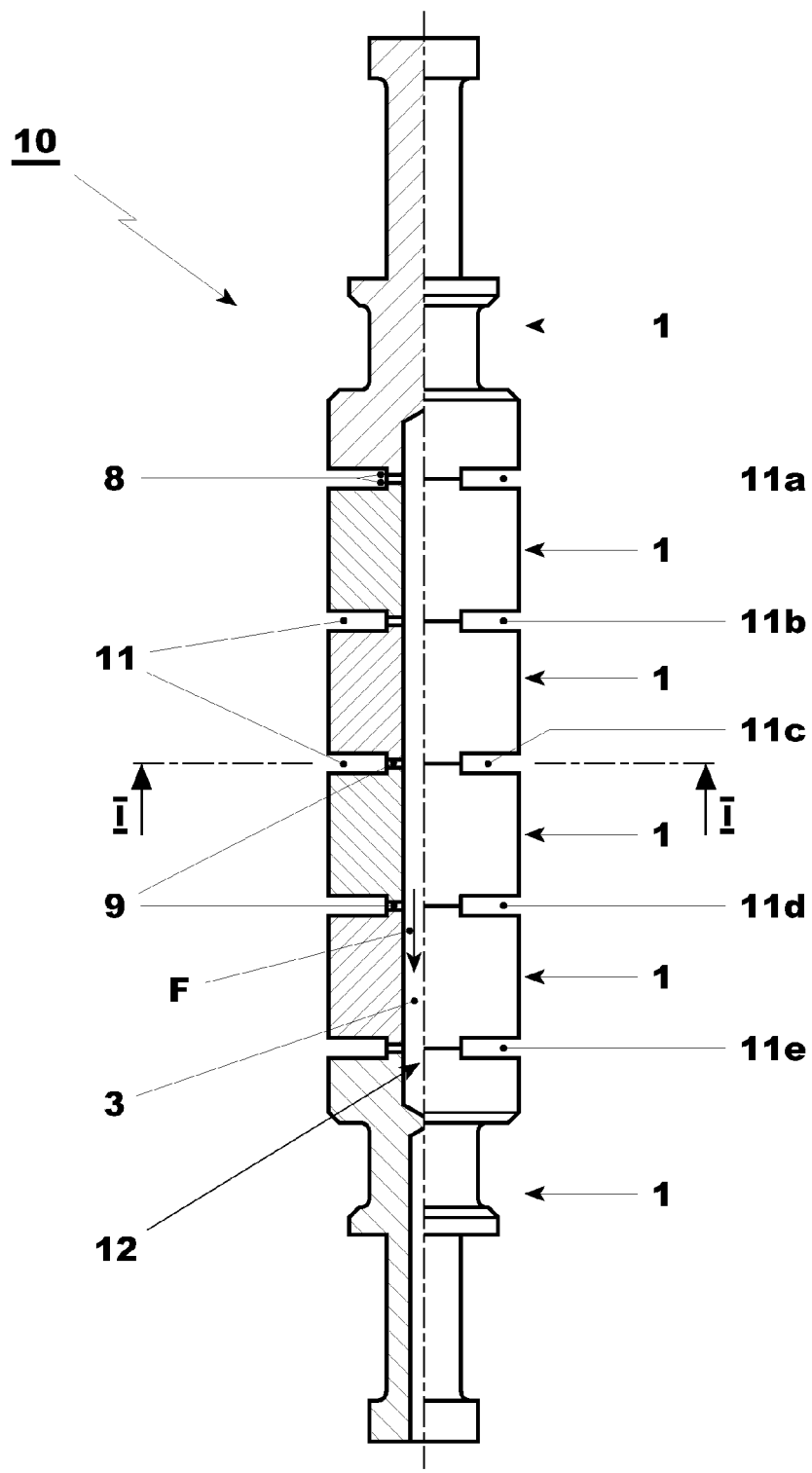
FIG. 1 is a schematic view of a pile of elements to be welded to manufacture a rotor.
Figure 4:
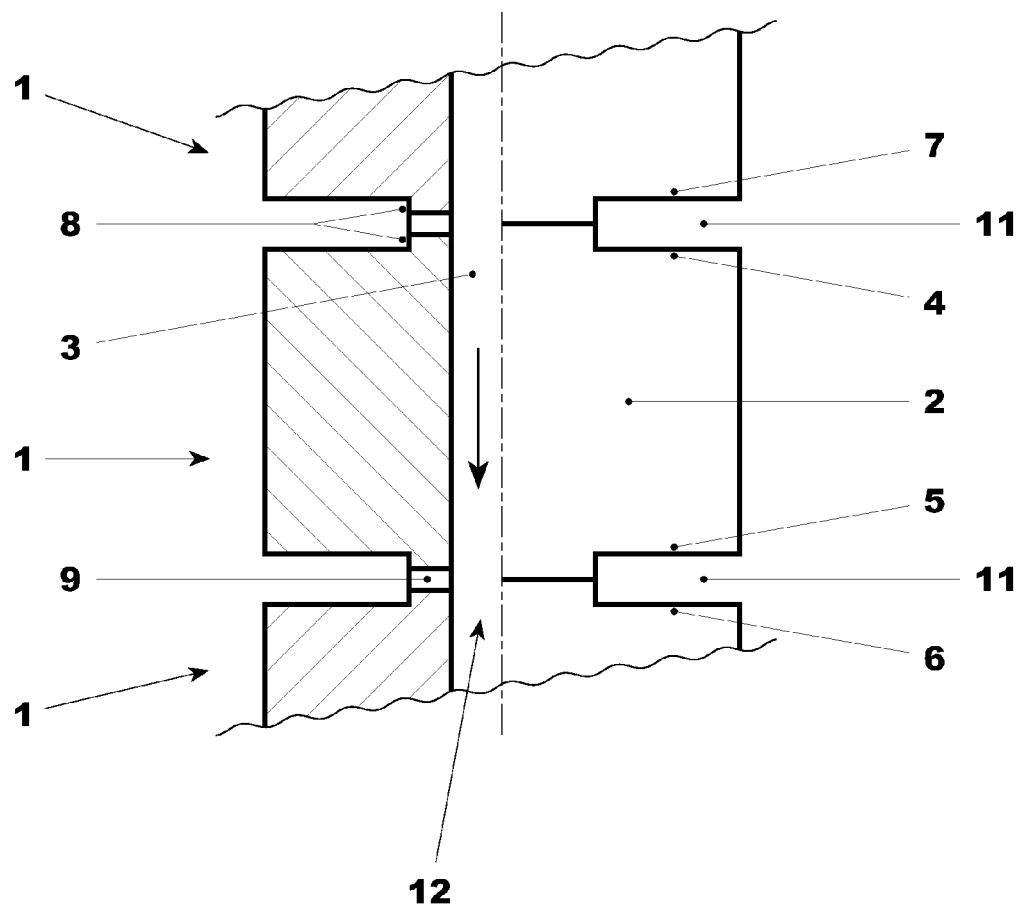
FIG. 4 is an enlarged partial longitudinal section/view of an element connected to other elements.

FIG. 1 shows the elements 1 stacked one above the other and FIG. 4 schematically shows (enlarged) one of the elements 1 connected to other elements 1.

The element 1 of FIG. 4 has a body 2 with an inner cavity 3 and two surfaces 4, 5 to be welded to surfaces 6, 7 of other adjacent elements 1.

In addition, FIG. 4 shows a collar 8 extending from each of the surfaces 4, 5, 6, 7 to be welded.

FIG. 1 shows that generally a plurality of elements 1 like the one shown in FIG. 4 are provided (in particular FIG. 1 shows four such elements 1, it is clear that their number can be any, such as only one or also more than four); additionally, elements 1 also having one surface to be welded and, consequently only provided with one collar at this surface, are typically provided.

In an embodiment of the method, the elements 1 are vertically stacked one above the other to form a pile 10; in particular the elements 1 are connected through spacers being the collars 8. For this reason, when the elements 1 are stacked, the facing surfaces 4, 7 and 5, 6 to be welded together define slots 11 between each other.

In the embodiment shown in FIG. 1, all the elements 1 have a cavity 3 and all the cavities 3 are connected together to form a bore 12 running over the whole pile 10; in this case the elements 1 at the two opposite ends of the pile 10 preferably have blind cavities, such that the bore 12 defined by the cavities 3 connected together does not open to the outside. The cavities of the elements between the described two end elements are through cavities.

Alternatively (FIG. 5), some of the elements 1 have the cavities 3 and one or more of the elements 1 within the pile 10 have no cavity and/or have blind cavities; thus the cavities 3 define one or more bores 12 (according to the configuration) extending over a part of the pile 10 (i.e. each bore 12 extends over only some elements 1, but not over all of the elements 1 of the pile 10).

The collars 8 have holes 9 (radial through holes) connecting the slots 11 to the bore 12; typically these holes 9 are drilled through the collars 8 after the elements 1 are stacked one above the others. These holes 9 are used for inspection during welding and to purge the bore 12. In the following, 9a indicates the holes through which an inert gas or mixture enters the bore 12 and 9b those holes through which it moves out therefrom.

Thus adjacent elements 1 are welded together within the slots 11; this first welding is a partial welding (pre welding), i.e. it does not completely fill the whole slots 11 in, but only a part of them.

In particular this welding is carried out by melting the collar 8 and preferably also by adding welding material within the slots 11. A welding process that can be used to carry out this welding is described in US 2008/0211339, which is incorporated by reference.

In addition, during welding the bore 12 is purged with an inert gas or mixture (typically containing $H_2$ and Ag or $H_2$ and $N_2$). This prevents oxidation of the welded parts.

Figure 5:
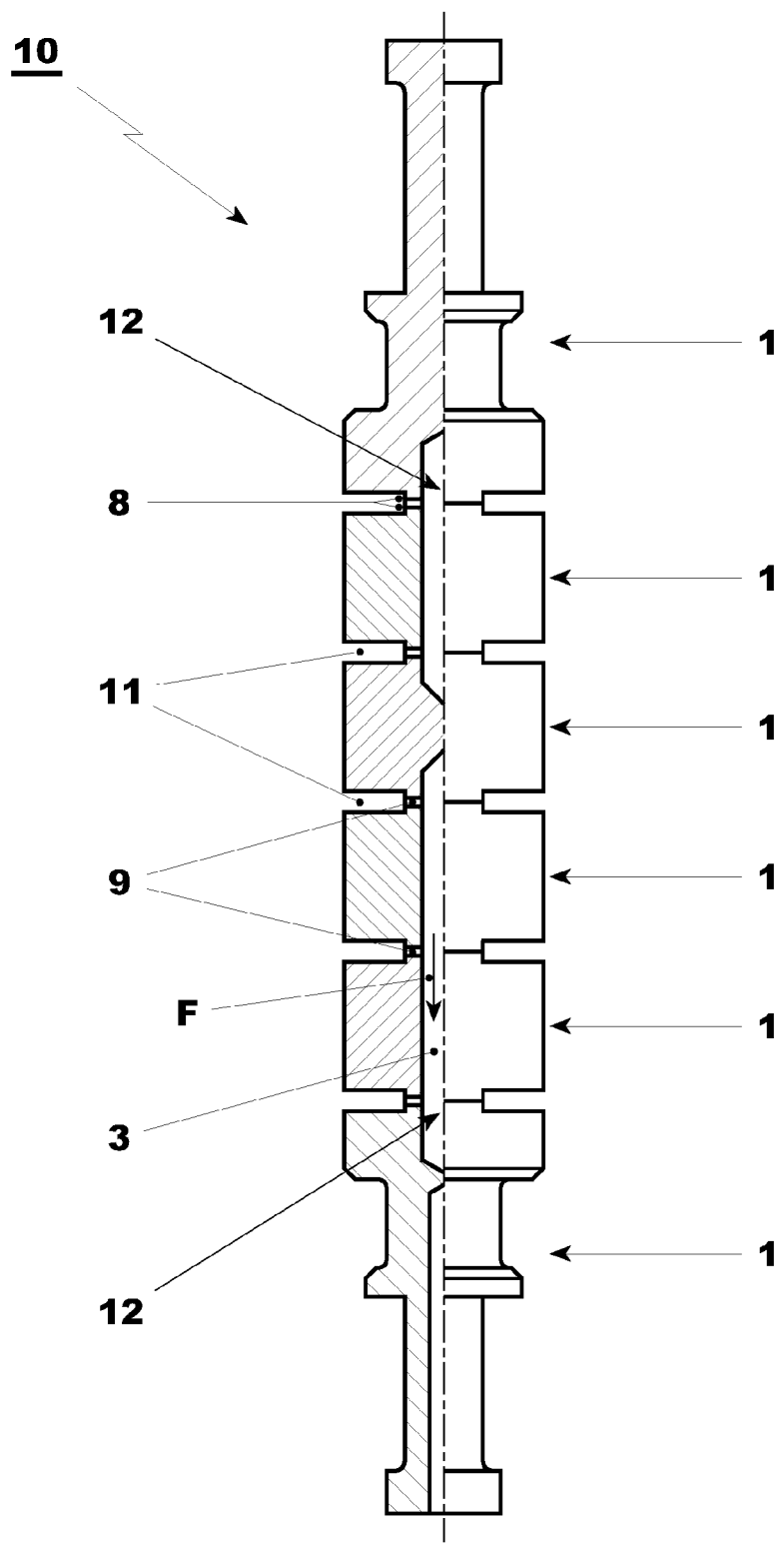
FIG. 5 is a schematic view of a pile of elements to be welded, to manufacture a rotor different from the one of FIG. 1.

In the following particular reference to FIG. 1 (with the bore 12 extending over the whole pile 10) is made; it is clear that the process is analogous in case the bore 12 extends only over a part of the pile 10 like for example shown in FIG. 5.

The slots 11 at the upper part of the bore 12 are welded before the slots 11 at the lower part of the bore 12 and at least one of the slots 11 at the upper part of the bore 12 is welded last.

In particular, adjacent elements 1 are sequentially welded from the top to the bottom of the bore 12 and the uppermost element 1 of the bore 12 is welded last.

Thus, with particular reference to FIG. 1 (that shows a pile 10 made of six elements 1) slot 11b is welded first, then in sequence slots 11c, 11d, 11e are welded and finally also slot 11a is welded.

This particular sequence allows the oxygen within the bore 12 to be discharged to the outside and the slot 11e at the bottom of the pile 10 to be welded practically in absence of oxygen (i.e. the oxygen is largely within admissible limits).

In fact, since the oxygen is heavier than the inert gas used for purging, slots 11b and 11c are typically welded without any oxidation problem.

Since, while these slots 11b, 11c are welded, purging with inert gas is carried out, when slot 11d must be welded the amount of oxygen within the bore 12 is very low (during purging oxygen contained within the bore 12 is discharged to the outside). In addition, even if small amounts of air enter from the top (slot 11a is not welded yet), it is rapidly discharged with the purge gas to the outside.

Thus when the slot 11e is welded the amount of oxygen within the bore 12 is also very small and practically does not create oxidation problems.

In addition, at this stage the bore 12 is still purged at the slot 11a.

Finally also the slot 11a is welded. This slot is welded last since the oxygen (air) eventually contained within the bore 12 gathers at the bottom of the same bore 12 as indicated by arrow F; therefore when the uppermost element 1a is welded no oxygen or no relevant amount of oxygen (air) is present in the zone of the welding.

Preferably, within the bore 12 an under-pressure is applied and the bore 12 is purged also before the elements 1 are welded.

In particular this purging before welding is carried out by injecting the inert gas or mixture into the bore 12 (the same inert gas or mixture used to purge during welding) through first holes 9a and making it move out from the bore 12 through second holes 9b.

Figure 2:
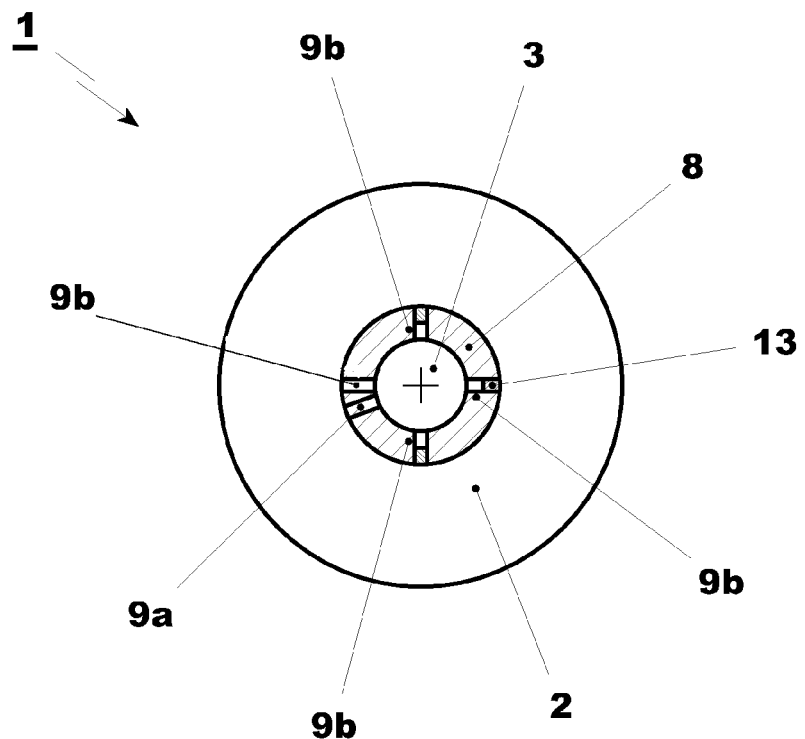
FIGS. 2 and 3 show a cross section through line I-I of FIG. 1 in two different manufacturing phases.
Figure 3:
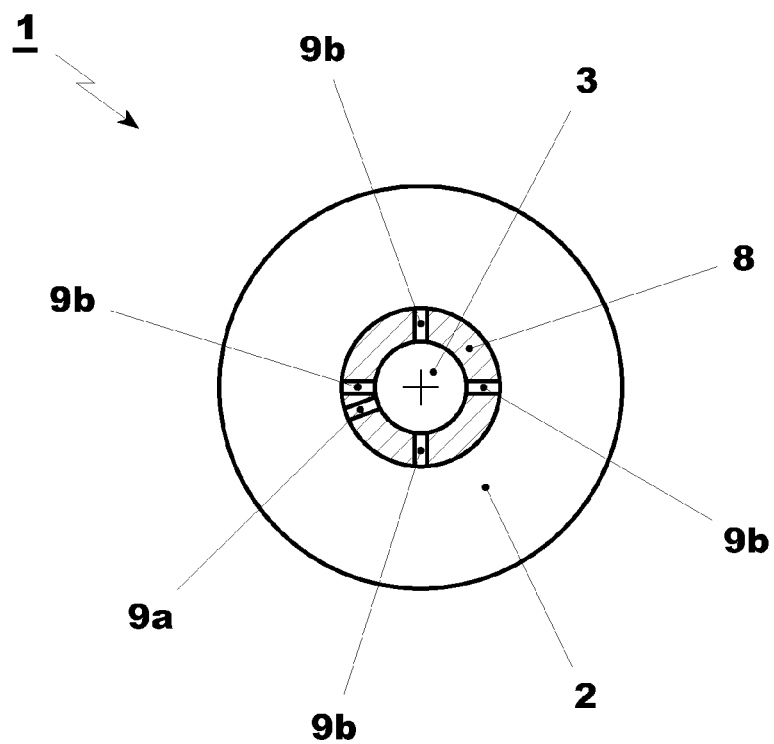

With reference to FIG. 2, one single first hole 9a and one single second hole 9b are used that are preferably angularly shifted by 15-25°, preferably about 20°; these holes 9a and 9b are provided at all the slots 11.

In practice since the elements often have four, five or also more holes 9, the holes to be used as first hole 9a and second hole 9b are open but the other are closed with a plug 13.

Purging during welding is carried out by injecting an inert gas or mixture through first holes 9a and making it move out from the cavities through second holes 9b; also in this case, the holes 9a and 9b at provided at all the slots 11.

In this case one single first hole 9a and a plurality of second holes 9b are used; advantageously the first hole 9a and at least one of the second holes 9b are angularly shifted by 15-25°, preferably about 20°.

Also in this case, if some of the holes 9 are not used as first hole 9a or second hole 9b, they are closed with a plug 13.

Moreover, an additional purging step can be implemented before the pre purging and/or during welding; in this last case the slots at the upper part (naturally, a slot at the upper part is not welded) and at the middle part of the bore 12 are welded, thus welding is stopped to implement this additional purging step, and finally also the slots at the lower part and the remaining slot at the upper part of the bore 12 are welded (in the way and with the purging already described).

This additional purging step includes introducing inert gas through one or more holes of slots at the upper part of the bore 12 and discharging it from one or more holes of slots at the lower part of the bore 12.

Afterwards, the pile 10 is tilted in a horizontal position and a final welding is realised within the slots to completely fill them in.

Then the pile 10 is tilted in the vertical position and thermal treatments are carried out.

Afterwards, the pile 10 is tilted in the horizontal position and a final machining is carried out.

It should be understood that the features described may be independently provided from one another.

In practice, the materials used and the dimensions can be chosen at will according to requirements and to the state of the art.

REFERENCE NUMBERS 1 elements
2 body
3 cavity
4 surface 5 surface
6 surface
7 surface
8 collar
9 hole
9a first hole
9b second hole
10 pile
11 slot
11a, 11b, 11c, 11d, 11e slots
12 bore
13 plug
F air

What is claimed is:

1. Method for manufacturing a rotor by welding a plurality of elements together, at least one element having a body with at least one cavity and at least one surface to be welded to a surface of an adjacent element, the method comprising: stacking the elements vertically one above the other to form a pile with facing surfaces to be welded together defining slots, wherein the cavity or cavities of adjacent elements define at least one bore that extends over at least a portion of the pile, welding adjacent elements together within the slots, purging the bore with an inert gas or mixture during welding, welding all but at least one of the slots at a first end of the bore before welding the slots at a second end of the bore and then welding the at least one of the slots at the first end of the bore last.

2. The method according to claim 1, wherein adjacent elements are sequentially welded from the top to the bottom of the bore.

3. The method according to claim 1, wherein the slot at an uppermost zone of the bore is welded last.

4. The method according to claim 1, further comprising applying an under-pressure within the bore before the elements are welded.

5. The method according to claim 1, wherein the bore is connected to the slots via holes.

6. The method according to claim 1, wherein after the vertically stacked elements are welded: the pile is tilted in a horizontal position and a final welding is realized within the slots, then the pile is tilted in the vertical position and thermal treatments are carried out, then the pile is tilted in the horizontal position and a final machining is carried out.

7. The method according to claim 5, wherein the holes are drilled after the elements are stacked to form the pile.

8. The method according to claim 5, further comprising purging the bore before the elements are welded.

9. The method according to claim 5, wherein purging during welding is carried out by injecting an inert gas or mixture into the bore through first holes and making it move out from the bore through second holes.

10. The method according to claim 9, wherein one single first hole and a plurality of second holes are used.

11. The method according to claim 10, wherein the first hole and at least one of the second holes are angularly shifted by 15-25° from each other.

12. The method according to claim 10, wherein the first hole and at least one of the second holes are angularly shifted by about 20° from each other.

13. The method according to claim 8, wherein purging before the elements are welded is carried out by injecting the inert gas or mixture into the bore through first holes and making it move out from the bore through second holes.

14. The method according to claim 13, further comprising using one single first hole and one second hole.

15. The method according to claim 14, wherein the first hole and the second hole are angularly shifted by 15-25° from each other.

16. The method according to claim 14, wherein the first hole and the second hole are angularly shifted by about 20° from each other.

* * * * *